United States Patent
Maugars

(10) Patent No.: US 9,627,913 B2
(45) Date of Patent: Apr. 18, 2017

(54) MOBILE DEVICE TO CONTROL A CHARGE PAD SYSTEM

(75) Inventor: Philippe Maugars, Ranes (FR)

(73) Assignee: NXP B.V., Eindhoven (NL)

( * ) Notice: Subject to any disclaimer, the term of this patent is extended or adjusted under 35 U.S.C. 154(b) by 1113 days.

(21) Appl. No.: 13/059,386

(22) PCT Filed: Jul. 30, 2009

(86) PCT No.: PCT/IB2009/053319
§ 371 (c)(1),
(2), (4) Date: Feb. 16, 2011

(87) PCT Pub. No.: WO2010/020895
PCT Pub. Date: Feb. 25, 2010

(65) Prior Publication Data
US 2011/0136550 A1    Jun. 9, 2011

(30) Foreign Application Priority Data
Aug. 18, 2008  (FR) .................... 08 290779

(51) Int. Cl.
*H04B 1/38* (2015.01)
*H02J 7/02* (2016.01)
*H04B 5/00* (2006.01)

(52) U.S. Cl.
CPC ............ *H02J 7/025* (2013.01); *H04B 5/0037* (2013.01)

(58) Field of Classification Search
CPC .. H02J 7/025; H02J 5/005; H02J 17/00; H02J 7/0027; H02J 7/04; H04B 5/0037; H04B 5/0081; H04B 5/0093

USPC ............... 455/573, 41.1, 41.2, 572
See application file for complete search history.

(56) References Cited

U.S. PATENT DOCUMENTS

| | | | |
|---|---|---|---|
| 2004/0000893 A1* | 1/2004 | Raichle et al. | 320/135 |
| 2007/0145830 A1* | 6/2007 | Lee et al. | 307/135 |
| 2007/0182367 A1* | 8/2007 | Partovi | 320/108 |
| 2009/0033280 A1* | 2/2009 | Choi et al. | 320/108 |
| 2009/0039828 A1* | 2/2009 | Jakubowski | 320/106 |
| 2009/0096413 A1* | 4/2009 | Partovi et al. | 320/108 |

FOREIGN PATENT DOCUMENTS

| | | |
|---|---|---|
| DE | 200 16 655 U1 | 2/2002 |
| WO | 2007/015599 A1 | 2/2007 |
| WO | 2007/089086 A1 | 8/2007 |
| WO | 2008/044875 A1 | 4/2008 |

OTHER PUBLICATIONS

International Search Report for Counterpart Patent Appin. No. PCT/IB2009/053319 (Jun. 22, 2010).

* cited by examiner

*Primary Examiner* — Liton Miah

(57) ABSTRACT

A method of charging a mobile device on a charge pad. The method includes receiving a wireless charge from at least one of a plurality of charge pad power coils. The method also includes enabling communications between the charge pad and the mobile device. The method also includes sending a command from the wireless device to the charge pad to adjust a characteristic of the wireless charge at the charge pad and to enable the wireless device to control the characteristic of the wireless charge of the charge pad.

20 Claims, 5 Drawing Sheets

MOBILE DEVICE TO CONTROL A CHARGE PAD SYSTEM

FIELD OF THE INVENTION

Wireless energy transfer or wireless power transmission is a process of electrical energy transmission from a power source to an electrical load, without the use of electrical conductors or interconnecting wires. The transfer of energy takes place by electromagnetic coupling through a process known as mutual induction. Wireless communication is the transfer of information over a distance without the use of electrical conductors or interconnecting wires.

Radio-frequency identification (RFID) is an automatic identification method, relying on storing and remotely retrieving data using devices called RFID tags or transponders. Most RFID tags contain at least two parts. One is an integrated circuit for storing and processing information, modulating and demodulating an RF signal, and other specialized functions. The second is an antenna for receiving and transmitting the signal.

Passive RFID tags have no internal power supply. The minute electrical current induced in the antenna by the incoming radio frequency signal provides power for the CMOS integrated circuit in the RFID tag to power up and transmit a response. The RFID tag chip can contain non-volatile, possibly writable electrically erasable programmable read-only memory (EEPROM) for storing data. RFID devices in a tag, label, smartcard or the like are typically passive devices that operate without an internal power supply. However, some embodiments of the RFID device include at least one active component to facilitate RFID communication. RFID communication may operate within one or more frequency bands, such as super high frequency (SHF), ultra high frequency (UHF), very high frequency (VHF), and other similar frequency bands.

Near field communication (NFC) is a wireless connectivity technology that enables convenient short range communication between electronic devices. NFC is a wireless transmission technique implemented over distances up to approximately 10 centimeters, or comparable to a few times the diameter of a mobile device.

NFC communicates via magnetic field induction, where two loop antennas, or coils, are located within each other's near field, effectively forming an air-core transformer. NFC operates within the globally available and unlicensed radio frequency industrial, scientific, and medial (ISM) band of 13.56 MHz, with a bandwidth of approximately 2 MHz.

Mobile devices and, in particular, electronic equipment such as mobile phones and small handheld computers include secondary power cells for power supply which are usually provided in the form of rechargeable power cells, or rechargeable batteries. A charging operation of the rechargeable cells can be performed by using an adapter or charger which takes power from a main power supply such as a public electrical power network or other adequate source of power. The adapter or charger connected to the main power supply is further connected by a supply line and a suitable connector to the mobile device, and charging starts immediately upon physically connecting the devices.

A user typically plugs a connector into the mobile device with conventional adapters and chargers. The conventional adapter and charger should not be used in wet environments due to the possibility of corroding, shorting out the contacts, or electrical shock.

Unlike conventional adapters and chargers, an inductive charger transmits the electrical energy for charging the batteries of a mobile device through an electromagnetic field in a direct magnetic coupling without a physical electrical connection, i.e., without using a plug and socket. Hence, the inductive charger may be safely used in wet or dusty environments since both the charger and the device may be sealed devices without physical contacts being exposed to an outside environment. The basic principle of such inductive chargers involves magnetic cores with a coil wound around the cores, and a generated magnetic field penetrating through the air gap or a region of non-magnetic material between the devices and forming a magnetic inductive link for power transmission.

However, despite the advantages of the inductive charger over the conventional adapters and chargers, failure to actively monitor a charge cycle between the inductive charger and the mobile device can lead to permanent damage to the inductive charger, the mobile device, and or the rechargeable battery. Additionally, failure to actively monitor a charging cycle between the inductive charger and the mobile device can lead to overcharging and/or overheating of the inductive charger and/or mobile device, which can also lead to permanent damage. It is thus an object of the present invention to provide a mobile device and a method for communication with a charge pad, such as to prevent potential damage to the mobile device and the charge pad caused by a lack of monitoring of the characteristic of the wireless charge in real-time.

SUMMARY OF THE INVENTION

Embodiments of an apparatus are described. In one embodiment, the apparatus is a mobile device for communication with a charge pad. One embodiment of the mobile device includes a battery, a power coil coupled to the battery, and a communication device. The battery powers the mobile device. The power coil receives a wireless charge from at least one charge pad power coil. The communication device enables communications with the charge pad. The communication device also sends a command from the mobile device to the charge pad to adjust a characteristic of the wireless charge based on the command from the mobile device. Other embodiments of the apparatus are also described.

Embodiments of a system are also described. In one embodiment, the system is a charge pad system for wirelessly charging a mobile device. One embodiment of the charge pad system includes a power input, a coil array, and a coil controller. The power input receives power from a power source to power the charge pad system. The coil array includes at least one charge pad power coil. The coil array sends a wireless charge to a mobile device power coil. The coil controller activates at least one of the power coils of the coil array and adjusts a characteristic of the wireless charge based on a command from the mobile device to the charge pad. Other embodiments of the system are also described.

Embodiments of a method are also described. In one embodiment, the method is a method for wirelessly charging a mobile device. One embodiment of the method includes receiving a wireless charge from at least one charge pad power coil to charge a battery of the mobile device. The method also includes enabling communications between the charge pad and the mobile device. The method also includes sending a command from the wireless device to the charge pad to adjust a characteristic of the wireless charge at the charge pad. Other embodiments of the method are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION OF THE DRAWINGS

In the following description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

While many embodiments are described herein, at least some of the described embodiments facilitate a mobile device controlling a charge pad in a wireless charging system in conjunction with a communication device of the mobile device. The communication device includes at least a radio frequency (RF) identification (ID) communication device and a near-field communication (NFC) device. Allowing the mobile device to control a charge cycle between the mobile device and the charge pad prevents potential damage to the mobile device and/or the charge pad caused by a lack of monitoring a charge characteristic of the charge cycle in real-time. In particular, sending a command from the wireless device to the charge pad to adjust a characteristic of the wireless charge at the charge pad and enabling the wireless device to control the characteristic of the wireless charge of the charge pad may prevent potential damage to the mobile device and the charge pad caused by a lack of monitoring of the characteristic of the wireless charge in real-time.

Moreover, mobile device control of the charge pad allows the mobile device to perform a fine selection of power coils which can be used to optimize the power transfer and to minimize any potential leakage or inefficient radiation of the magnetic field of the wireless charge. A user places the mobile device on the charge pad. The position of the mobile device on the charge pad is acquired using RFID communication. The mobile device transmits an NFC identifier to the charge pad to identify the NFC mobile device and NFC communications are established. A first pulse of a power transmission is sent to the mobile device through one or more power coils on the charge pad and the received power is confirmed by the mobile device. A subsequent pulse of power is then sent from one or more other power coils on the charge pad and the received power is again confirmed by the mobile device. Once each of the charge pad's power coils have sent a pulse of power, the mobile device selects which set of one or more power coils to implement in a wireless charge of the mobile device according to the received power. The mobile device then controls the charging by monitoring the parameters of the wireless charge. Additionally, dynamic localization allows real-time tracking in case the mobile device moved on the charge pad. Furthermore, allowing the mobile device to control the charge cycle, in some embodiments, removes at least one step in a typical monitor sequence of the charge cycle.

Figure 1:
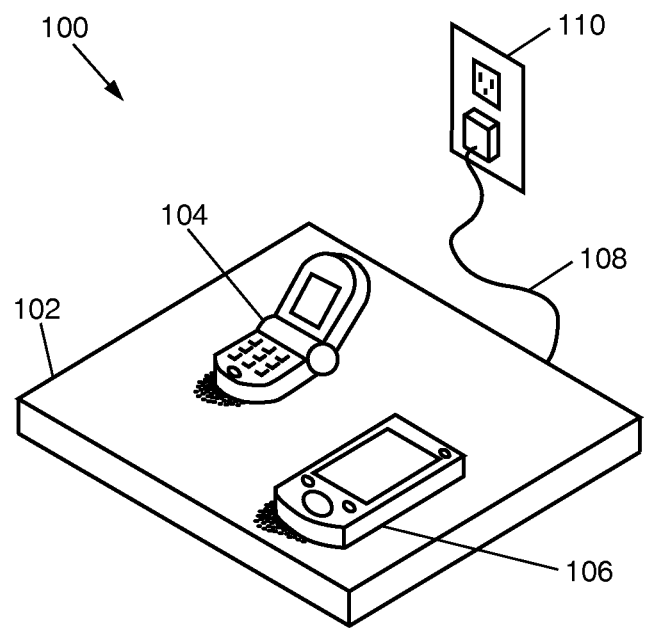
FIG. 1 depicts a schematic block diagram of one embodiment of a wireless charger system.

FIG. 1 depicts a schematic block diagram of one embodiment of a wireless charger system 100. The wireless charger system 100 includes a charge pad 102, mobile devices 104 and 106, a power cord 108 attached to the charge pad 102, and an electrical outlet 110. As depicted, the mobile devices 104 and 106 are placed on a planar surface of the charge pad 102.

It should be noted that the configurations of the charge pad 102, the mobile device 104, the other mobile device 106, the power cord 108, and the electrical outlet 110 are not limited to particular hardware or software implementations.

Although the depicted wireless charger system 100 is shown and described herein with certain components and functionality, other embodiments of the wireless charger system 100 may be implemented with fewer or more components or with more or less functionality. For example, some embodiments of the power cord 108 include a transformer to transform the voltage provided by the electrical outlet 110. Additionally, in some embodiments, the wireless charger system 100 includes three or more mobiles devices placed on the charge pad 102. Additionally, some embodiments of the wireless charger system 100 include similar components arranged in another manner to provide similar functionality, in one or more aspects.

Additionally, where two or more mobile devices such as the mobile devices 104 and 106 are present within the wireless charger system 100, in one embodiment, the charge pad 102 may facilitate a single charge cycle among the mobile devices 104 and 106. Alternatively, in some embodiments, multiple mobile devices such as the mobile devices 104 and 106 may be present within the wireless charger system 100 and the charge pad 102 may facilitate a first charge cycle to mobile device 104 and a second charge cycle to mobile device 106.

Figure 3:
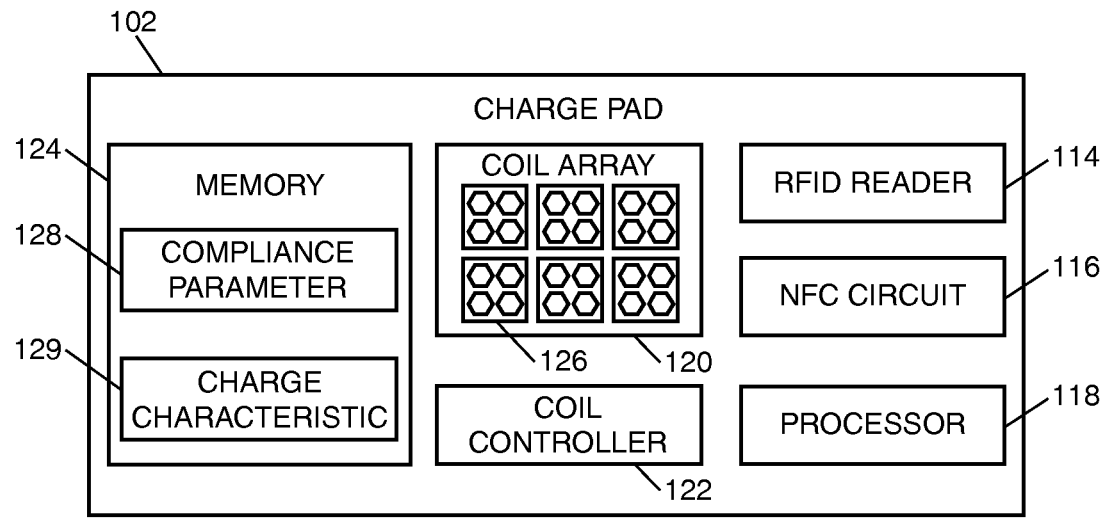
FIG. 3 depicts a schematic block diagram of one embodiment of the charge pad from the wireless charger system of FIG. 1.

In one embodiment, the illustrated charge pad 102 is a charging device that contains circuitry to detect the presence of, authenticate, negotiate with and charge a battery of a wide range of mobile devices such as the mobile devices 104 and 106. As illustrated, the charge pad 102 contains a flat surface on which a user may place the mobile devices 104 and 106. In some embodiments, the mobile devices 104 and 106 receive a wireless charge from the charge pad 102 to recharge the batteries of the mobile devices 104 and 106. The charge pad 102 is powered from the electrical outlet 110. The electrical outlet 110 may be connected to any power source, including a main power grid that provides electricity service to a home or office. The charge pad 102 includes a power cord 108 which connects the charge pad 102 to the electrical outlet 110. One example of the charge pad 102 is shown in FIG. 3 and described in more detail below.

In one embodiment, the mobile devices 104 and 106 are placed on the charge pad 102 to receive a wireless charge from the charge pad 102. In some embodiments, the mobile devices 104 and 106 contain circuitry to detect the presence of, authenticate, negotiate and communicate with the charge pad 102. In other words, in some embodiments, the charge pad 102 authenticates the mobile devices 104 and 106 while the mobile devices 104 and 106 authenticate the charge pad 102. Hence, in some embodiments, the charge pad 102 and a mobile device such as mobile device 104 facilitate a dual authentication scheme to optimize the charge cycle in terms of security, safety, and power efficiency.

Figure 4:
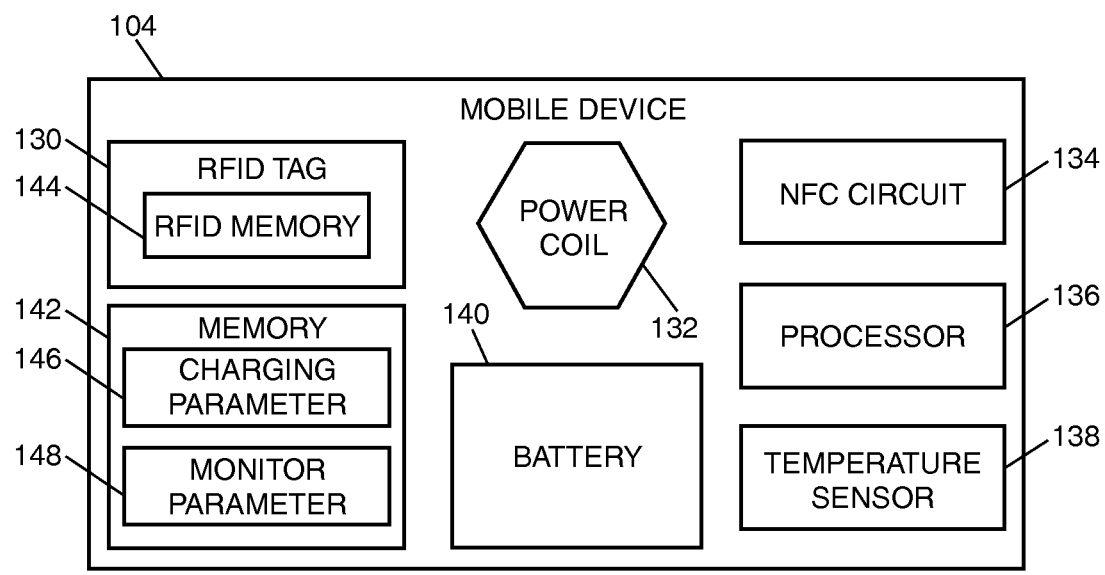
FIG. 4 depicts a schematic block diagram of one embodiment of the mobile device from the wireless charger system of FIG. 1.

In some embodiments, the mobile devices 104 and 106 are representative of any portable device that contains a rechargeable battery or power cell. For example, the mobile devices 104 and 106 may include a cell-phone, a personal digital assistant (PDA), a media player, a pager, a remote control, a toothbrush, a shaver, a computer mouse, a time piece such as a wrist watch, a gaming device, and any other type of rechargeable mobile device. In some embodiments, each of the mobile devices 104 and 106 placed on the charge pad 102 interactively control the charge pad 102 so that the charging operation, or charge cycle, is optimized specific to each mobile device in terms of security, safety, and power efficiency. One example of the mobile device 104 is shown in FIG. 4 and described in more detail below. It should be noted that any reference specific to the mobile device 104 is representative of either of the mobile devices 104 and 106.

Figure 2:
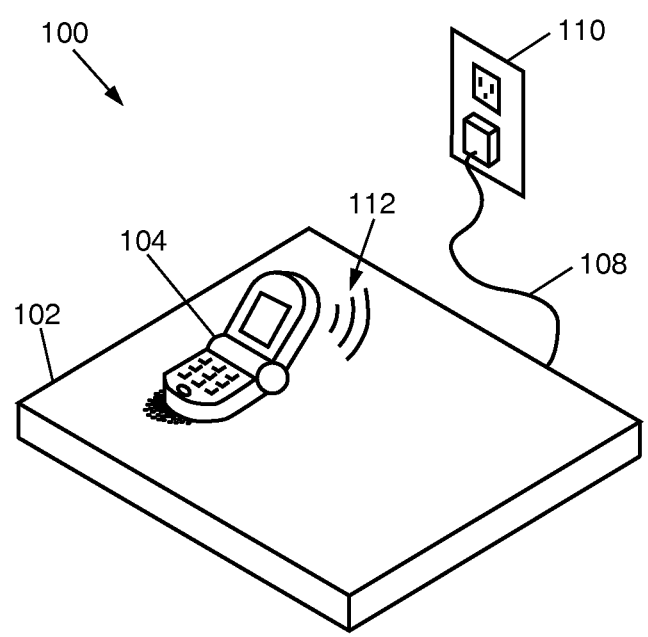
FIG. 2 depicts one embodiment of the mobile device sending a control command to the charge pad of FIG. 1.

FIG. 2 depicts one embodiment of the mobile device 104 sending a control command 112 to the charge pad 102 of FIG. 1. As depicted, the mobile device 104 is placed on the charge pad 102. In one embodiment, the mobile device 104 enables communications with the charge pad 102 to send a control command 112 to the charge pad 102 to adjust a characteristic of the wireless charge. Sending the control command 112 from the mobile device 104 to the charge pad 102 to adjust a characteristic of the wireless charge at the charge pad 102 and, thus, enabling the mobile device 104 to control the characteristic of the wireless charge of the charge pad 102 may prevent potential damage to the mobile device 104 and the charge pad 102 caused by a lack of monitoring of the characteristic of the wireless charge in real-time.

In some embodiments, the mobile device 104 enables communications with the charge pad 102 to send a control command 112 to the charge pad 102 to initiate the wireless charge. Furthermore, in some embodiments, the mobile device 104 sends a control command 112 to the charge pad 102 to terminate the wireless charge. Additionally, in some embodiments, the control command 112 is implemented in the dual authentication scheme described above.

FIG. 3 depicts a schematic block diagram of one embodiment of the charge pad 102 from the wireless charger system 100 of FIG. 1. The charge pad 102 includes a radio-frequency identification (RFID) reader 114, a near field communication (NFC) circuit 116, and a processor 118. Additionally, the charge pad 102 includes a coil array 120, a coil controller 122, and a memory device 124. Furthermore, in some embodiments, the coil array 120 includes at least one coil zone 126. Additionally, the memory device 124 stores a compliance parameter 128 and a charge characteristic 129.

It should be noted that the configurations of the device detector 112, the RFID reader 114, and the NFC circuit 116 are not limited to particular hardware or software implementations. Likewise, the configurations of the processor 118, the coil array 120, the coil controller 122, and the memory device 124 are not limited to particular hardware or software implementations.

Although the depicted charge pad 102 is shown and described herein with certain components and functionality, other embodiments of the charge pad 102 may be implemented with fewer or more components or with more or less functionality. For example, in some embodiments, each coil zone 126 of the coil array 120 includes at least one power coil. Additionally, at least some of the components of the charge pad 102 may be implemented, at least partially, on an integrated circuit. Additionally, embodiments of the charge pad 102 may be implemented in other configurations such as a vertical orientation. As an example, the charge pad 102 may be mounted to a wall and include at least one hook or pocket to hold the mobile devices 104 and 106 on or near the charge pad 102. In another embodiment, the charge pad 102 may include a strap to attach one or more mobile devices 104 and 106 relative to the charge pad 102. Additionally, the mobile devices 104 and 106 may receive a wireless charge from the charge pad 102 when placed in direct contact with the charge pad 102 or when placed within a certain proximity to the charge pad 102. For example, the mobile device 104 may receive a wireless charge from the charge pad 102 when a user places the mobile device 104 adjacent to the charge pad 102 instead of directly on the charge pad 102.

In one embodiment, the illustrated RFID reader 114 performs a detection sequence to detect the mobile device 104 on the charge pad 102. In some embodiments, the detection sequence includes a detection of an RFID tag from the mobile device 104. In some embodiments, the detection sequence includes a detection of a mobile device NFC circuit. The RFID reader 114 reads an RFID tag to receive RFID data from the mobile device 104. In some embodiments, verification of the RFID data from the mobile device 104 represents a first authentication of the mobile device 104 to the charge pad 102 in a dual authentication scheme. Once a valid and authorized mobile device is detected by the RFID reader 114, the RFID reader 114 may request an NFC identifier (NFCID) and control data initially stored in the RFID tag of the mobile device 104. If the charge pad 102 and the mobile device 104 are allowed to interact, then the charge pad 102 adds the NFCID of the mobile device 104 to a polling sequence. The polling sequence contains a list of devices that the charge pad 102 cycles through in order to perform a presence check and verify that a certain device is not removed from the charge pad 102.

More specifically, in some embodiments, the RFID reader 114 receives RFID data from an RFID transponder (tag/label) in the mobile device 104 in response to a request for the RFID data from the RFID reader 114 to allow the charge pad 102 to perform a device check of the mobile device 104. In one embodiment, the device check represents the first authentication of the mobile device 104 to the charge pad 102. In some embodiments, the RFID reader 114 operates within a high frequency band such as ultra high frequency (UHF). Additionally, in some embodiments, the RFID reader 114 is configured to simultaneously read RFID data from one or more RFID tags or labels from one or more mobile devices. For example, some embodiments of the RFID reader 114 operate within a frequency range of 840-960 MHz and read over 1000 RFID tags/labels per second. Other embodiments may be implemented to operate using different transmission parameters.

In some embodiments, the RFID reader 114 is further configured to intermittently read the RFID tag during a current charge cycle. The intermittent reception of RFID data from the RFID tag comprises a presence check that the mobile device 104 is currently on the charge pad 102. In some embodiments, the RFID reader 114 is further configured to restart the detection sequence in response to a non-reply from the mobile device 104 during an intermittent read operation of the RFID tag. The RFID reader 114 intermittently selects the mobile device 104 from a list of mobile devices on the charge pad 102 according to the aforementioned polling sequence. Intermittently selecting the mobile device 104 in the polling sequence allows the RFID reader 114 to read the RFID tag of the mobile device 104 to verify that the mobile device 104 is currently on the charge pad 102.

In one embodiment, the NFC circuit 116 is configured to open an NFC channel of communication with the mobile device 104. The NFC circuit 116, in some embodiments, sends a compliance parameter 128 to the mobile device 104 over the NFC channel of communication to allow the mobile device 104 to perform a compliance check of the charge pad 102. In some embodiments, the compliance parameter 128 includes a charge pad manufacturer ID, a charge pad model ID, a list of supported charge rates, a list of supported voltage levels, and a list of supported amperage levels, and other related charge pad specifications. In some embodiments, the compliance check represents the second authentication of the charge pad 102 to the mobile device 104 in the dual authentication scheme.

In one embodiment, the depicted processor 118 executes instructions and operations related to the wireless charging of the mobile device 104 by the charging pad 102. The processor 118 analyzes the characteristic of the wireless charge in conjunction with the testing sequence of the charge pad 102 and processes the control command 112 from the mobile device 104 to adjust a characteristic of the wireless charge.

The illustrated coil array 120 includes at least one coil zone 126. Each coil zone 126 includes at least one charging power coil. In one embodiment, the coil array 120 sends the wireless charge to the mobile device 104. The illustrated coil controller 122 controls the operations and functions of the coil array 120. In one embodiment, the coil controller 122 activates the coil zone 126.

In some embodiments, the coil controller 122 adjusts the operation of the coil array 126 according to the command from the mobile device 104 to the charge pad 102 to adjust a characteristic of the wireless charge. For example, the charge pad 102 may receive a command from the mobile device 104 to increase the charge rate of the wireless charge. The processor 118 processes the command from the mobile device 104 and directs the coil controller 122 to increase the charge rate of the coil array 120 in relation to the mobile device 104 in response and according to the command.

In some embodiments, the coil controller 120 is further configured to activate at least one power coil of the coil zone 126 in response to the reception of the RFID data and a non-reply from the mobile device 104 following the transfer of the compliance parameter 128 to the mobile device 104. The non-reply is based on a timeout threshold that indicates the mobile device battery is fully discharged. The coil array 120 then applies the wireless charge to the mobile device 104 according to a charge rate specified in the RFID data when a dead battery is detected by the charge pad 102. In some embodiments, the coil controller 120 is further configured to activate at least one power coil of the coil zone 126 in response to the reception of the RFID data and a reply from the mobile device 104 following the transfer of the compliance parameter 128 to the mobile device 104. The coil array 122 then applies the wireless charge to the mobile device 104 according to a charge rate specified by the RFID data.

The illustrated memory 124 stores the compliance parameter 128 and the charge characteristic 129. In one embodiment, the compliance parameter 128 includes a charge pad manufacturer ID, a charge pad model ID, a list of supported charge rates, a list of supported voltage levels, a list of supported amperage levels, among other possible compliance parameters. The charge characteristic 129 may include a current charge rate of a charge cycle, voltage and amperage levels of a current charge cycle, a current operating temperature of the charge pad 102, and so forth. The charge characteristic 129 may also include characteristics pertaining to the present state of the mobile device 104 as well as information from the RFID data such as charging guidelines related to the charging of the mobile device 104.

FIG. 4 depicts a schematic block diagram of one embodiment of the mobile device 104 from the wireless charger system 100 of FIG. 1. The mobile device 104 includes an RFID tag 130, a device power coil 132, and a device NFC circuit 134. Additionally, the mobile device 104 includes a device processor 136, a temperature sensor 138, a battery 140, and a memory device 142. Furthermore, some embodiments of the RFID tag 130 include an RFID memory device 144. Additionally, some embodiments of the memory device 142 include a charging parameter 146 and a monitor parameter 148.

It should be noted that in some embodiments, at least some of the components of the illustrated mobile device 104 of FIG. 4 are more or less representative of the mobile devices 104 and 106 of FIG. 1. It should also be noted that the configurations of the RFID tag 130, the device power coil 132, and the device NFC circuit 134 are not limited to particular hardware or software implementations. Likewise, the device processor 136, the temperature sensor 138, the battery 140, and the memory device 142 are also not limited to particular hardware or software implementations. For example, the battery may be a nickel metal hydride battery, a lithium ion battery, or any other type of rechargeable battery.

Although the depicted mobile device 104 of FIG. 4 is shown and described herein with certain components and functionality, other embodiments of the mobile device 104 may be implemented with fewer or more components or with more or less functionality. For example, at least some components of the mobile device 104 may be integrated on an integrated circuit.

In one embodiment, the RFID tag 130 includes an RFID memory 144 to store data related to the mobile device 104 and guidelines related to the proper charging of the mobile device 104. In some embodiments, the RFID tag 130 stores RFID data in the RFID memory 144. The RFID data may include a minimum charge rate, a maximum charge rate, a battery level threshold, a temperature threshold, a device manufacturer ID, a device model ID, and other data related to the operation and charging functionality of the mobile device 104. In other words, the RFID data stored in the RFID memory 144 may include charging guidelines as well as real-time monitoring parameters related to the current state of the mobile device 104 such as the level of charge in the battery 140 and the temperature of the mobile device 104.

In one embodiment, the power coil 132 receives a wireless charge from the charge pad 102. In some embodiments, the mobile device 104 implements the power coil 132 to communicate with the charge pad 102 using near field communication techniques. In some embodiments, the power coil 132 is implemented to charge the mobile device 104 as well as to simultaneously allow the mobile device 104 to communicate with the charge pad 102. It should be noted, although the illustration of the mobile device 104 depicts a single power coil 132, the mobile device 104 may include two or more power coils. Hence, in some embodiments, the mobile device 104 communicates with the charge pad 102 through at least one power coil such as the power coil 132 and the mobile device 104 receives a wireless charge from the charge pad 102 from at least one additional power coil.

In one embodiment, the NFC circuit 134 sends the control command 112 to the charge pad 102 to adjust a characteristic of the wireless charge. In some embodiments, the NFC circuit 134 sends the control command 112 to the charge pad 102 to initiate the wireless charge. In some embodiments, the NFC circuit 134 sends the control command 112 to control at least one aspect of the wireless charge. Hence, NFC circuit 134 in conjunction with the power coil 132 allows the mobile device 104 to control the charge pad 102 during the wireless charge.

In one embodiment, the RFID tag 130 enables the charge pad 102 to authenticate the mobile device 104 as well as to detect when the mobile device 104 is placed on the charge pad 102. The RFID tag 130 may be a passive device that allows the mobile device 104 to operate even if the battery 140 of the mobile device 104 is dead. Following device authentication and device detection by the charge pad 102, the NFC circuit 134 initiates control communications with the charge pad 102 to allow the mobile device 104 to control at least one aspect of the wireless charge. If at any time during the wireless charge the control communications are interrupted, the charge pad 102 detects the interruption and thus senses the removal of the mobile device 104 from the charge pad 102. Upon detecting removal of the mobile device 104 from the charge pad 102, the charge pad 102 removes power to the wireless charge of the mobile device 104. Thus, the charge pad 102 does not continue to radiate the wireless charge when the mobile device 104 is removed from the charge pad 102.

In one embodiment, the processor 136 executes instructions and operations related to the control of the charging pad 102 by the mobile device 104. The processor 136 analyzes the characteristics of the wireless charge in conjunction with a testing sequence of the charge pad 102. In some embodiments, the processor 136 directs the NFC circuit 134 to send the control command 112 to the charge pad 102 to adjust a characteristic of the wireless charge based on the analysis of the characteristic of the wireless charge. In some embodiments, the NFC circuit 134 implements the power coil 132 to communicate with the charge pad 102 using near field communication techniques.

In some embodiments, the illustrated NFC circuit 134 performs a detection sequence to detect the charge pad 102. In some embodiments, the detection sequence includes a detection of a charger NFC circuit 116. The NFC circuit 134 initiates a near field communication channel with the charge pad 102 to send a control command 112 related to a characteristic of the wireless charge of the mobile device 104.

In some embodiments, the NFC circuit 134 is further configured to initiate the testing sequence to test the effect of a wireless charge from each of the power coils of the coil array 120. Hence, the NFC circuit 134 sequentially tests each of the charge pad power coils to determine which of the power coils of the coil array 120 to implement in the wireless charge of the power coil. In some embodiments, following a general localization of a power coil of the coil array 120, the NFC circuit 134 enters a fine localization loop. Once a general region of a power coil is determined, the NFC circuit 134 then directs the charge pad 102 to sequentially activate each neighbor power coil of the general region and selects the power coil(s) of the coil array 120 that provides the highest relative received power at the device power coil 132.

In some embodiments, the NFC circuit 134 is further configured to initiate the testing sequence to test a sequence of charge rates associated with the wireless charge. In some embodiments, the NFC circuit 134 sequentially tests the list of supported charge rates included in the compliance parameter 128 received from the charge pad 102 as part of the dual authentication scheme of the wireless charging system 100. The NFC circuit 134 tests the sequence of charge rates to determine which charge rate to implement in the wireless charge of the power coil 132.

Additionally, in some embodiments, the NFC circuit 134 is further configured to initiate the testing sequence to test a sequence of voltage and/or amperage levels associated with the wireless charge. In some embodiments, the NFC circuit 134 sequentially tests the list of supported voltage and/or amperage levels included in the compliance parameter 128 received from the charge pad 102 as part of the dual authentication scheme of the wireless charging system 100. The NFC circuit 134 tests the plurality of voltage and/or amperage levels to determine which of the voltage and/or amperage levels to implement in the wireless charge of the power coil. Hence, the characteristics of the wireless charge may include a selection of at least one power coil of the coil array 120, a selection of a charge rate, a selection of an amperage level, a selection of a voltage level, and other similar characteristics of wireless charges.

In some embodiments, the NFC circuit 134 is further configured to query the battery 140 to detect the current battery level and to send the control command 112 to the charge pad 102 to adjust a characteristic of the wireless charge according to the current battery level. Likewise, in some embodiments, the NFC circuit 134 is further configured to query the temperature sensor 138 to detect a current system temperature and to send the control command 112 to the charge pad 102 to adjust a characteristic of the wireless charge according to the current system temperature.

The illustrated device memory 142 stores the charging parameter 146 and the monitor parameter 148. The RFID data that the RFID tag 130 sends to the charge pad 102 may include the charging parameter 146. In other words, the RFID data, in some embodiments, is based on a charging parameter 146 stored in the memory 142. Thus, the charging parameter 146 may include a minimum charge rate, a maximum charge rate, a battery level threshold, a temperature threshold, a device manufacturer ID, a device model ID, and other data related to the operation and charging functionality of the mobile device 104. Likewise, the monitor parameter 148 may include the most recent data related to the battery level of the battery 140, the system temperature of the mobile device 104, and other real-time data related to the mobile device 104 under charge. In some embodiments, the mobile device 104 sends the monitor parameter 148 to the charge pad 102. Furthermore, in some embodiments, intermittently selecting the mobile device 104 in the polling sequence allows the NFC circuit 116 to request the monitor parameter 148 from the mobile device 104 during the current charge cycle. Hence, the NFC circuit 134 of the mobile device 104 intermittently sends the monitor parameter 148 to the charge pad 102 through the NFC circuit 116 of the charge pad 102.

Figure 5:
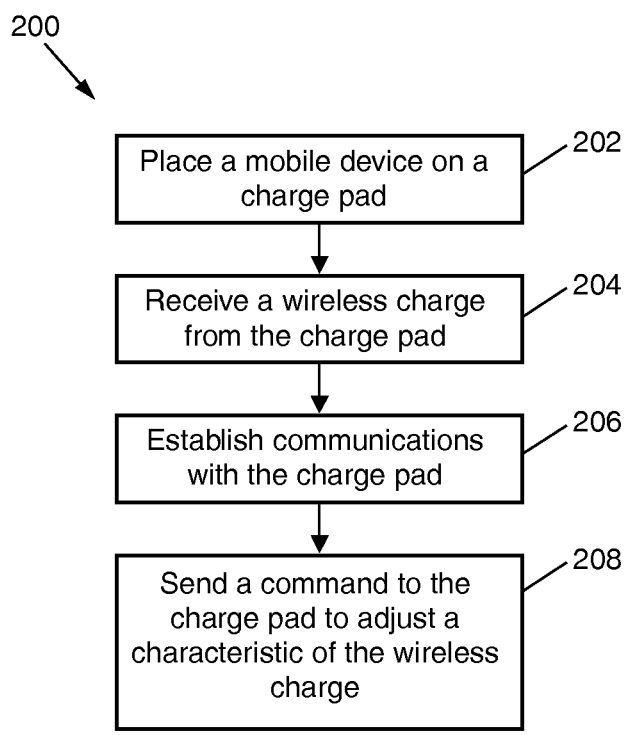
FIG. 5 depicts a schematic flow chart diagram of one embodiment of a method for active monitoring of the mobile device of FIG. 1.

FIG. 5 depicts a schematic flow chart diagram of one embodiment of a method 200 for active monitoring of the mobile device of FIG. 1. Although the method 200 is described in conjunction with the wireless charging system 100 of FIG. 1 and components thereof, other embodiments of the method 200 may be implemented with other wireless charging systems and/or other components thereof.

In one embodiment, at block 202 of the illustrated method 200, a user places the mobile device 104 on the charge pad 102. The mobile device 104 receives a wireless charge from the charge pad 102 at block 204. At block 206, the mobile device 104 establishes communication with the charge pad 102. In some embodiments, the mobile device 104 establishes communications with the charge pad 102 using an NFC protocol. In some embodiments, the mobile device 104 establishes communication with the charge pad using an RFID protocol.

At block 208, the mobile device 104 sends a command to the charge pad 102 to adjust a characteristic of the wireless charge. In some embodiments, the mobile device 104 sends the command to the charge pad using the NFC protocol. In some embodiments, the mobile device 104 sends the command to the charge pad using the RFID protocol. In some embodiments, the mobile device 104 initiates the wireless charge by sending a control command 112 to the charge pad 102.

Figure 6:
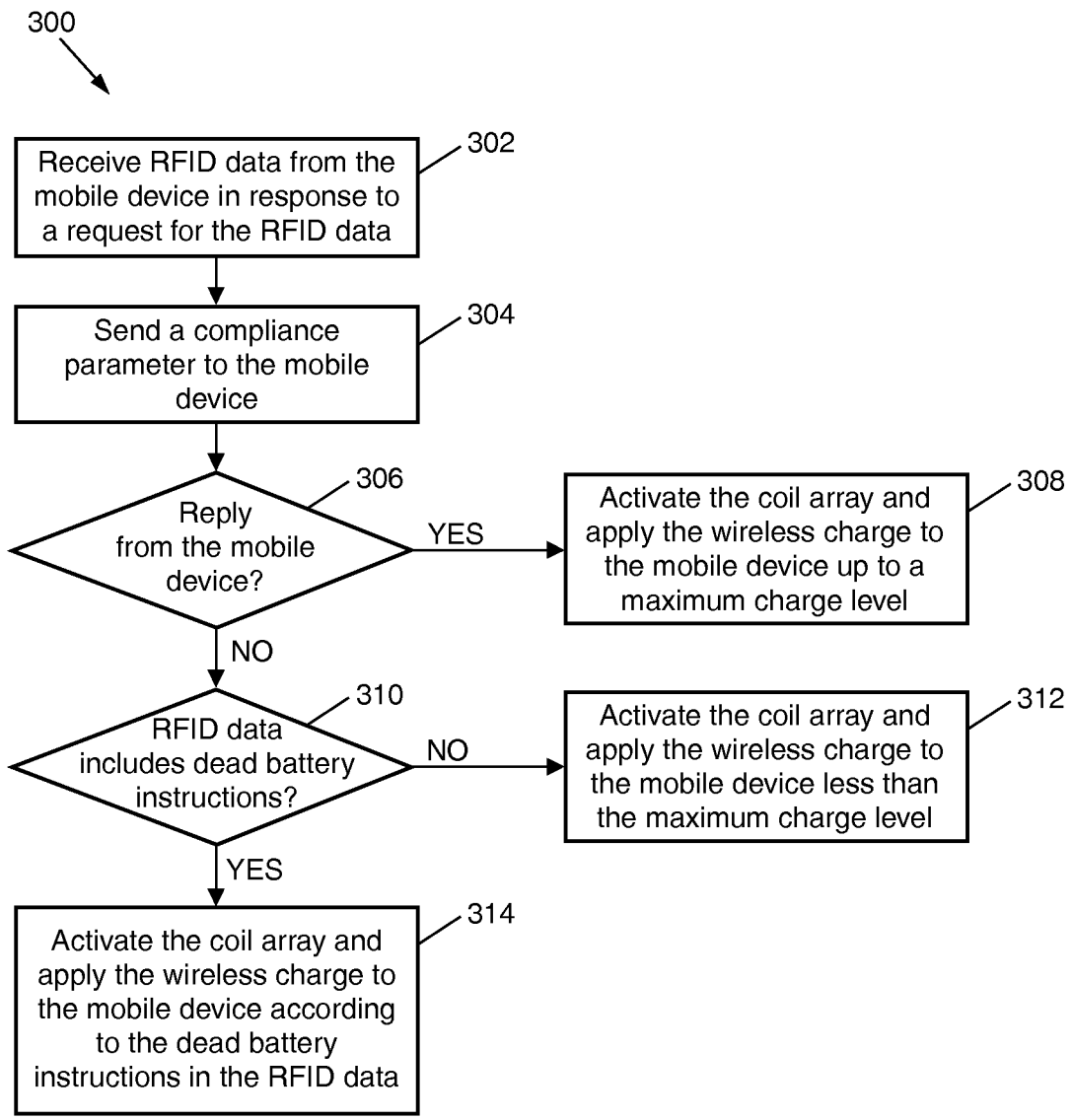
FIG. 6 depicts a schematic flow chart diagram of one embodiment of a method for charging the mobile device of FIG. 1 dependent on a charge state of the battery of the mobile device.

FIG. 6 depicts a schematic flow chart diagram of one embodiment of a method 300 for charging the mobile device 104 of FIG. 1 when the battery 140 of the mobile device 104 is fully discharged. Although the dead battery method 300 is described in conjunction with the wireless charging system 100 of FIG. 1 and components thereof, other embodiments of the dead battery method 300 may be implemented with other wireless charging systems and/or other components thereof.

In one embodiment, at block 302 of the illustrated method 300, the mobile device 104 receives a request from the charge pad 102 to send RFID data. The RFID reader 114 then receives RFID data from the mobile device 104. The charge pad 102 then sends a compliance parameter 128 to the mobile device 104 at block 304. At block 306, the charge pad 102 determines whether the mobile device 104 sends a reply to the reception of the compliance parameter 128.

In some embodiments, a non-reply is based on a timeout threshold. When the reply of the mobile device 104 exceeds the timeout threshold and the charge pad 102 receives RFID data from the mobile device 104, the non-reply indicates the battery 140 of the mobile device 104 is fully discharged. If the charge pad 102 receives a reply from the mobile device 104, at block 308, the coil controller 122 activates the coil array 122 and applies the wireless charge to the mobile device 104 up to the maximum charge level specified in the RFID data.

Otherwise, at block 310, the RFID reader 114 determines whether the RFID data includes instructions specific to a fully discharged battery condition. If the RFID reader determines that the RFID data does not contain dead battery instructions, at block 312, the coil controller 122 activates the coil array 122 and applies the wireless charge to the mobile device 104 at less than the maximum charge level specified in the RFID data. Otherwise, at block 314, the coil controller 122 activates the coil array 122 and applies the wireless charge to the mobile device 104 according to the dead battery instructions specified in the RFID data.

Figure 7:
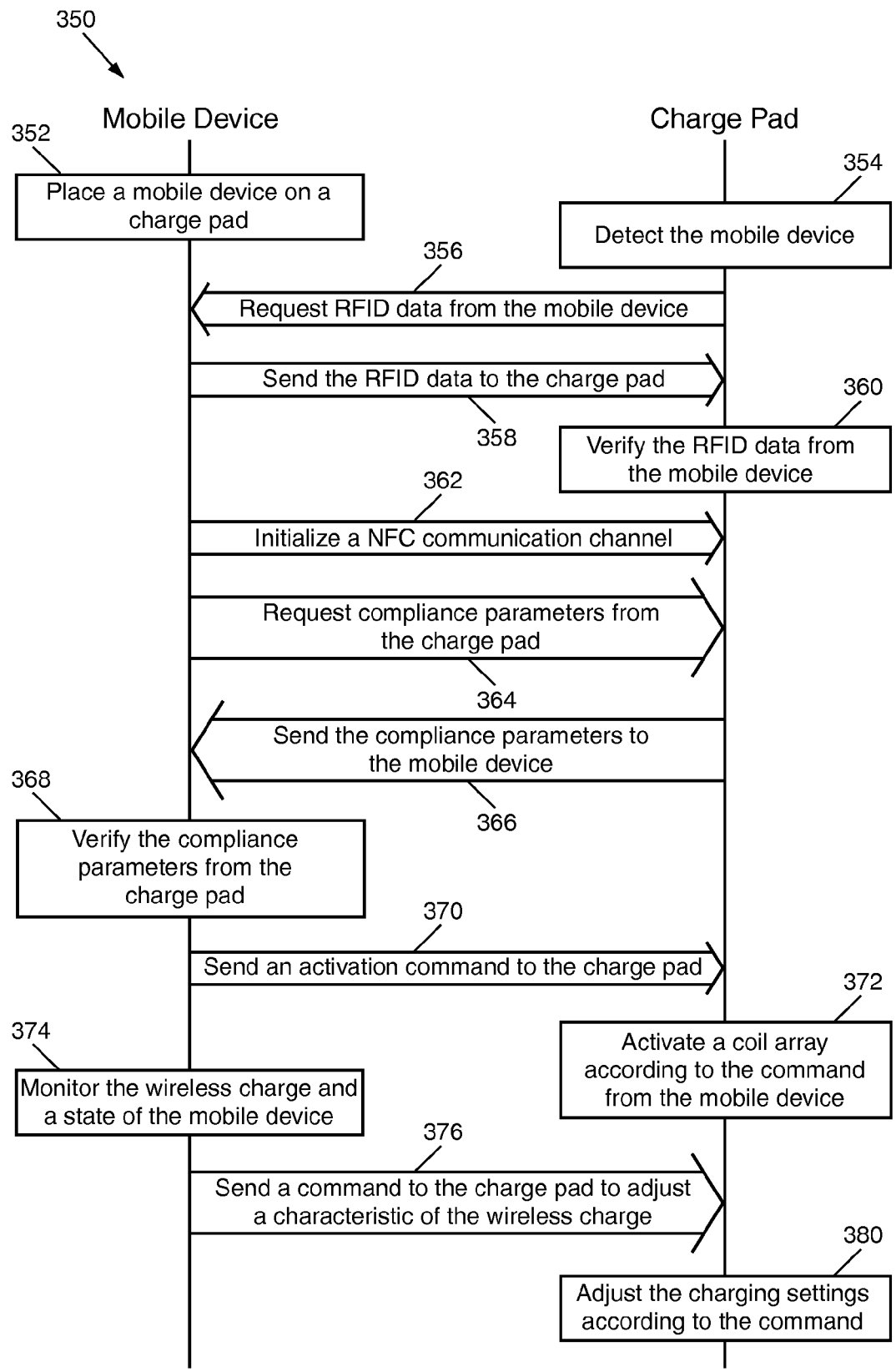
FIG. 7 depicts a schematic flow chart diagram of one embodiment of a process of the mobile device to control a charge cycle of the charge pad of FIG. 1.

FIG. 7 depicts a schematic flow chart diagram of one embodiment of a process 350 of the mobile device controlling a charge cycle of the charge pad of FIG. 1. Although the process 350 is described in conjunction with the wireless charging system 100 of FIG. 1 and components thereof, other embodiments of the process 350 may be implemented with other wireless charging systems and/or other components thereof.

In one embodiment, at block 352 of the illustrated process 350, a user places the mobile device 104 on the charge pad 102. The charge pad 102 detects the mobile device 104 at block 354. Alternatively, in some embodiments, the mobile device 104 detects the charge pad 102 at block 354. From a communication perspective, the charge pad 102 is the initiator, in many instances, because the charge pad 102 interrogates the mobile device 104. However, the mobile device 104 may nevertheless master, or control, the charge pad 102 by sending information to the charge pad 102, as described herein.

In some embodiments, at block 356, the RFID reader 114 of the charge pad 102 requests RFID data from the mobile device 102. In response to the request for the RFID data, at block 358, the RFID tag 130 of the mobile device 104 sends the RFID data to the charge pad 102. At block 360, the pad processor 118 reads and processes the RFID data to verify that the mobile device 104 is a compliant device for wireless charging on the charge pad 102. If the charge pad 102 determines via the pad processor 118 that the mobile device 104 is not compliant for wireless charging, then detection and authentication terminates. For example, in some embodiments, the compliance parameter 128 may include a list of compliant mobile devices according to mobile device IDs. Hence, the pad processor 118 may compare an ID of the mobile device 104 contained in the RFID data to a list of mobile device IDs stored in the memory device 124. If the pad processor 118 determines a match exists between the ID of the mobile device 104 and the list of the mobile device IDs, then the charge pad 102 determines that the mobile device 104 is valid and authenticated. Otherwise, the charge pad 102 determines that the mobile device 104 is invalid.

At block 362, the mobile device 104 initializes NFC communications with the charge pad 102, and at block 364, the mobile device 104 requests compliance parameters from the charge pad 102 to verify the compatibility of the charge pad 102 with the mobile device 104. At block 366, the charge pad 102 sends the compliance parameters to the mobile device 104. At block 368, the device processor 136 reads and processes the compliance parameters of the charge pad 102 to verify that the charge pad 102 is a compliant device for wireless charging of the mobile device 104. If the mobile device 104 determines that the charge pad 102 is not compliant for wireless charging of the mobile device 104, then detection and authentication terminates. On the other hand, at block 370, the mobile device 104 sends an activation command to the charge pad 102 to initiate the wireless charge. Hence, the initialization of the charge cycle, in some embodiments, includes a dual authentication between the charge pad 102 and the mobile device 104.

The coil controller 122 activates at least one coil from the coil array 120, at block 372, according to the activation command from the mobile device 104. As explained above, the mobile device 104 sends a location command to the charge pad 102 in order to determine which power coil, or power coils, to activate in the coil array 120. At block 374, the device processor 136 then monitors the wireless charge in conjunction with a current state of the mobile device 104 under charge. For example, the device processor 136 may monitor the current state of the battery 140 of the mobile device 104 such as a battery level. Likewise, the device processor 136 may monitor the current temperature of the mobile device 104 under charge in conjunction with the temperature sensor 138. At block 376, the NFC circuit 134 sends a command to the charge pad 102 to adjust a characteristic of the wireless charge according to the real-time monitoring of the wireless charge and/or the current state of the mobile device 104 under charge. At block 380, the charge pad 102 adjusts the characteristic of the wireless charge according to the command from the mobile device 104.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

An embodiment of a data processing system suitable for storing and/or executing program code includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

The invention claimed is:

1. A mobile device for communication with a charge pad, the mobile device comprising:
    a battery configured to power the mobile device;
    a power coil coupled to the battery, the power coil configured to receive a wireless charge from at least one of a plurality of charge pad power coils;
    a communication device configured to enable communications with the charge pad, to send a command from the mobile device to the charge pad, to adjust a characteristic of the received wireless charge based on the command sent from the mobile device, to initiate a testing sequence to test a plurality of charge rates, and to perform a selection of one of the tested charge rates for the received wireless charge; and
    a processor coupled to the communication device with the charge pad, wherein the processor is configured to actively monitor the wireless charge of the mobile device in conjunction with a current state of the mobile device under charge, to analyze the characteristic of the monitored wireless charge in conjunction with a testing sequence of the charge pad, and to direct the communication device to send the command to the charge pad, wherein the sent command is based on both the active monitoring and the analysis of the characteristic of the wireless charge, and the characteristic of the wireless charge comprises the selected charge rate.

2. The mobile device of claim 1, wherein the communication device is further configured to initiate the testing sequence to test a sequence of the plurality of charge pad power coils and to perform a selection of the at least one of the plurality of charge pad power coils to emit the wireless charge, and the characteristic of the wireless charge comprises the selection of the at least one of the plurality of charge pad power coils.

3. The mobile device of claim 1, wherein the communication device is further configured to initiate the testing sequence to test a plurality of amperage levels, to perform a selection of one of the tested amperage levels for the wireless charge, and the characteristic of the wireless charge comprises the selected amperage level.

4. The mobile device of claim 1, wherein the communication device is further configured to initiate the testing sequence to test a plurality of voltage levels, to perform a selection of one of the tested voltage levels for the wireless charge, and the characteristic of the wireless charge comprises the selected voltage level.

5. The mobile device of claim 1, wherein the communication device is further configured to query the battery to detect a current battery level and to send the command to the charge pad to adjust the characteristic of the wireless charge according to the detected battery level.

6. The mobile device of claim 1, further comprising:
    a temperature sensor coupled to the communication device, wherein the communication device is further configured to query the temperature sensor to detect a current system temperature and to send the command to the charge pad to adjust the characteristic of the wireless charge according to the detected system temperature.

7. The mobile device of claim 1, wherein the communication device comprises a radio-frequency (RF) identification (ID) device, is further configured to send RFID data to the charge pad during the communications between the mobile device and the charge pad to allow the charge pad to perform a device check of the mobile device, and the RFID data comprise at least one device parameter of a minimum charge rate, a maximum charge rate, a battery level threshold, a temperature threshold, a device manufacturer ID, and a device model ID.

8. The mobile device of claim 1, wherein the communication device further comprises:
 a near field communication (NFC) circuit, wherein the communication device is further configured to send identification (ID) data to the charge pad in response to a request for the ID data from the charge pad to allow the charge pad to perform a device check of the mobile device and to receive a compliance parameter from the charge pad in response to a request for the compliance parameter from the mobile device, the received compliance parameter to allow the mobile device to perform a compliance check of the charge pad, the compliance parameter comprises at least one charge pad parameter of a charge pad manufacturer ID, a charge pad model ID, a list of supported charge rates, a list of supported voltage levels, and a list of supported amperage levels, and the device check comprises a first authentication of the mobile device to the charge pad and the compliance check comprises a second authentication of the charge pad to the mobile device.

9. A method of wirelessly charging a mobile device, the method comprising:
 receiving a wireless charge from at least one of a plurality of charge pad power coils to charge a battery of the mobile device;
 enabling communications between the charge pad and the mobile device;
 actively monitoring the received wireless charge of the mobile device in conjunction with a current state of the mobile device under charge;
 analyzing a characteristic of the received wireless charge in conjunction with a testing sequence of the charge pad, wherein the testing sequence comprises testing a plurality of charge rates associated with the received wireless charge, and the analyzed characteristic of the wireless charge comprises a selection of one of the plurality of charge rates;
 determining which of the plurality of charge rates to implement in the wireless charge of the charge pad power coil; and
 sending a command from the wireless device to the charge pad to adjust the analyzed characteristic of the wireless charge and to enable the wireless device to control the analyzed characteristic of the wireless charge of the charge pad power coil.

10. The method of claim 9, the method further comprising:
 testing a sequence of the plurality of charge pad power coils, wherein the characteristic of the wireless charge comprises a selected charge pad power coil; and
 determining which charge to implement in the wireless charge of the charge pad power coil.

11. The method of claim 9, the method further comprising:
 querying the battery to detect a current battery level of the wireless device; and
 sending the command to the charge pad to adjust the characteristic of the wireless charge according to the detected battery level.

12. The method of claim 9, the method further comprising:
 querying a temperature sensor to detect a current system temperature of the wireless device; and
 sending the command to the charge pad to adjust the characteristic of the wireless charge according to the detected system temperature.

13. The method of claim 9, further comprising:
 performing a general localization of a power coil of a coil array.

14. The method of claim 13, further comprising:
 performing a fine localization loop.

15. The method of claim 13, further comprising:
 selecting the power coil of the coil array that provides a highest relative received power at a device power coil.

16. The method of claim 9, further comprising:
 testing the plurality of charge rates as part of a dual authentication scheme.

17. The method of claim 9, further comprising:
 sequentially testing each of the plurality of charge pad power coils.

18. The method of claim 9, further comprising:
 sequentially testing a list of supported charge rates.

19. The method of claim 9, further comprising:
 sequentially testing a list of supported voltage levels.

20. The method of claim 9, further comprising:
 sequentially testing a list of supported amperage levels.

* * * * *